Figure 1:
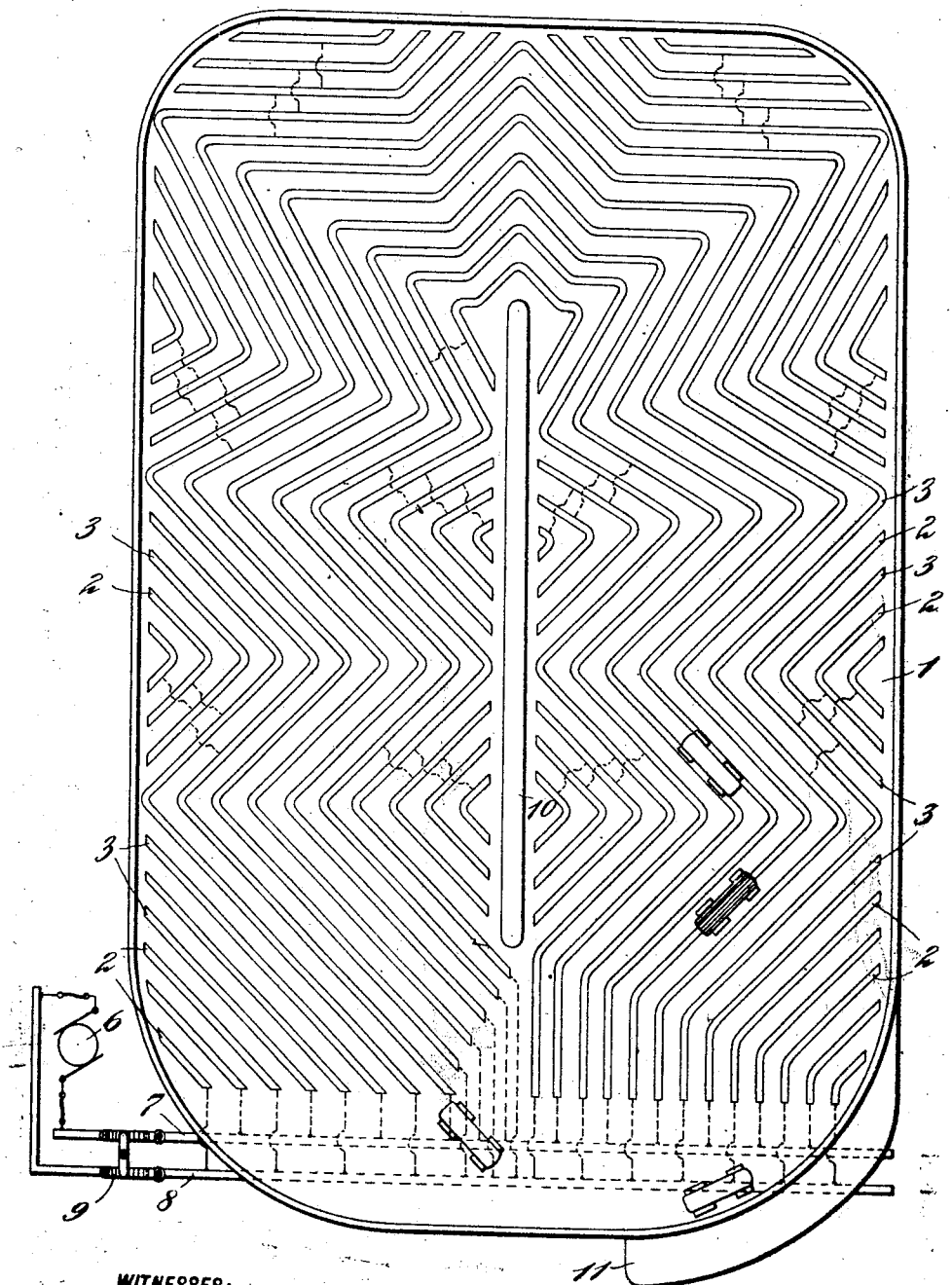

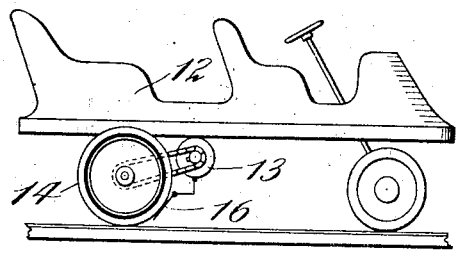
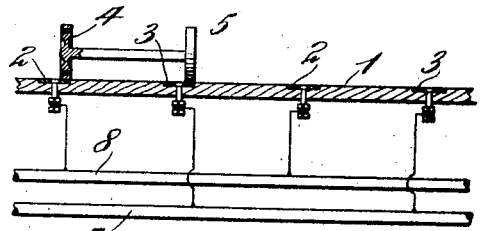
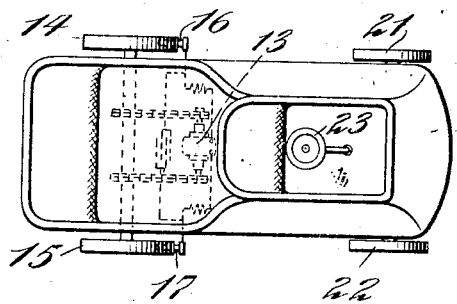
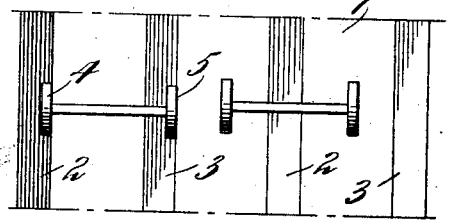
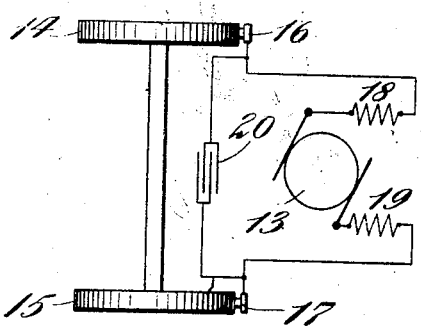

UNITED STATES PATENT OFFICE.

HARRY HERTZBERG AND MAURICE J. WOHL, OF NEW YORK, N. Y.

AMUSEMENT DEVICE.

978,884. Specification of Letters Patent. Patented Dec. 20, 1910.

Application filed October 30, 1909. Serial No. 525,534.

*To all whom it may concern:*

Be it known that we, HARRY HERTZBERG and MAURICE J. WOHL, citizens of the United States, and residents, respectively, of the city of New York, borough of Brooklyn, county of Kings, and State of New York, and of the city, county, and State of New York, have invented certain new and useful Improvements in Amusement Devices, of which the following is a specification.

This invention relates to amusement devices and has for its object the provision of a device in which passengers are carried in a car which is electrically propelled and arranged to travel over a floor under the guidance of a passenger and in which the progress of the car depends upon the skill with which the same is guided.

In carrying out the invention a level floor or platform is formed and provided with parallel conductors having their exposed faces flush with the surface of the platform and forming therewith a continuous surface over which a car may travel.

A car is provided and arranged to carry one or more passengers and is supplied with a low voltage motor taking its current from the wheels of the car as the same pass over the conducting strips on the platform.

In the drawings like parts in the several views have been given the same reference numerals.

Figure 1 is a plan view of the platform upon which the cars are operated. Fig. 2 is a side elevation of one of the cars. Fig. 3 is a plan view of Fig. 2. Fig. 4 is an enlarged section view of a portion of the platform, showing the conducting strips in place and two of the wheels in contact therewith. Fig. 5 is an enlarged plan view of a portion of the platform, showing the conducting strips with two of the wheels of a car in contact with the strips and also two wheels of another car out of contact. Fig. 6 is a diagrammatic view showing the motor operating circuit.

At 1 is shown the platform which may be constructed of wood or other material having suitable insulating properties for the low voltage circuit used in operating the cars. Conducting strips, such as 2 and 3, are arranged parallel to one another and extending in changing directions over the surface of the platform 1. These strips are placed an equal distance apart and are set into the platform 1 so that their upper surfaces are flush with the upper surface of the platform. The upper surface of the conducting strips may be somewhat wider than the car wheels 4 and 5 so as to allow some latitude in guiding the car over the same. This construction is shown in Figs. 4 and 5. Current is supplied to the conducting strips from a motor 6 through the bus bars 7 and 8. A motor switch 9 is provided to disconnect the conducting strips when desired.

It will be noted that the strips are alternately connected to the positive and negative side of the supply circuit and as the strips are spaced an equal distance apart corresponding to the distance between centers of the car wheels, the current will be supplied to the car when the wheels are in contact with any two adjacent conducting strips.

A central dividing wall 10 may be provided in the platform 1 to prevent the cars from crossing directly from one side to the other of the same. A landing platform 11 may be provided from which the passengers enter and leave the cars.

The car 12 is provided with a low voltage series-wound motor 13. The rear wheels of the car 12 are provided with metal tires 14 and 15, which are preferably insulated from the wheels and car, from which the current is taken through the brushes 16 and 17 and the regulating resistances 18 and 19 to the motor 13.

A condenser 20 is connected across the motor supply circuit, as shown in Fig. 6. The object of this condenser is to prevent the spark when the circuit is broken by the wheels leaving the contact strips.

The front wheels of the car, 21 and 22, are preferably insulated from the car and are arranged to be turned by means of a hand wheel 23 for steering the car in the usual manner.

In operation, after the passengers have entered the car the same is pushed by an attendant and guided by one of the passengers until the rear wheels engage the contact strips. As soon as this contact is made, the circuit is completed through the motor and the car is driven thereby as long as the operator follows the contact strips, but on account of the sharp turns provided it will be seen that this will require some dexterous and skilful management. Should the car leave the contact strips it will continue under the momentum acquired and will soon engage other strips when a sudden impulse will be given by the connection of the motor in the circuit. If the operator on the car desires, he may continue crossing and recrossing various contact strips, resulting in alternately slowing down and suddenly starting up of the car. If the operator is not skilful in guiding the car the same will be propelled, nevertheless, with varying starting impulses as the wheels cross the contact strips.

It will thus be seen that a novel form of amusement device is provided in which many interesting results can be obtained by a skilful operator and various amusing results by an unskilful operator, which is the object sought to be obtained in this device.

As many changes could be made in the above construction and many apparently widely different embodiments of our invention designed without departing from the scope of the appended claims, we intend that all matter contained in the above description or shown in the accompanying drawings shall be interpreted merely as an operative embodiment of our invention and not in a limiting sense.

What we claim is:

1. In a device of the character described, in combination, a platform provided with conductors extending in irregular directions and having exposed faces flush with the surface of said platform, and a car provided with an electric motor adapted to receive its operating current from said conductors and to propel the car over said platform.

2. In a device of the character described, in combination, a platform provided with a plurality of pairs of conductors extending in irregular directions and equally spaced thereon and adapted to permit a car to be propelled thereon in any direction, and a car provided with an electric motor adapted to receive its operating current from any of said pairs of conductors and to propel the car over said platform.

3. In a device of the character described, in combination, a platform provided with a plurality of equally spaced conductors extending in irregular directions and alternately connected to the positive and negative side of a supply circuit, a supply circuit, and adapted to permit a car to be propelled thereon in any direction, and a car provided with an electric motor adapted to receive its operating current from any two adjacent conductors and to propel the car over said platform.

4. In a device of the character described, in combination, a platform provided with conductors positioned in angularly extending straight lines with sharp turns between the straight portions, and a car provided with an electric motor adapted to receive its operating current from said conductors and to propel the car over said platform.

5. In a device of the character described, in combination, a platform adapted to permit a car to travel in irregular directions thereover and provided with parallel conductors, and a car provided with an electric motor adapted to receive its operating current from said conductors and to propel the car over said platform.

6. In a device of the character described, in combination, a platform provided with conductors in changing directions and extending in a continuous circuit over the surface of the platform, and a car provided with an electric motor adapted to receive its operating current from said conductors and to propel the car over said platform.

7. In a device of the character described, in combination, a platform provided with conductors extending in changing directions thereover and forming a part of the surface of said platform over which a car may travel, and a car provided with an electric motor adapted to receive its operating current from said conductors and to propel the car over said platform.

8. In a device of the character described, in combination, a platform provided with conductors extending in changing directions thereover and forming a part of the surface of said platform over which a car may travel, each conductor being wider than the wheels of said car, and a car provided with an electric motor adapted to receive its operating current from said conductors and to propel the car over said platform.

9. In a device of the character described, in combination, a platform provided with conductors, and a car having a pair of wheels provided with conducting tires insulated therefrom, said car being also provided with a motor electrically connected to said tires and arranged to receive its operating current from said conductors to propel the car over said platform.

10. In a device of the character described, in combination, a platform provided with conductors, and a car having a pair of wheels provided with conducting tires insulated therefrom, said car being also provided with a motor electrically connected to said tires through a pair of contact brushes and arranged to receive its operating current from said conductors to propel the car over said platform.

11. In a device of the character described, in combination, a platform provided with conductors, and a car having steering wheels insulated therefrom and also having a pair of wheels provided with conducting tires insulated therefrom, said car being also provided with a motor electrically connected to said tires and arranged to receive its operating current from said conductors to propel the car over said platform.

12. In a device of the character described, in combination, a platform provided with conductors, a car provided with a motor electrically connected to a pair of the wheels of the car and arranged to receive its operating current from said conductors to propel the car over said platform, and a condenser connected across the motor circuit.

13. In a device of the character described, in combination, a platform provided with conductors, a car provided with a motor electrically connected to a pair of the wheels of the car and arranged to receive its operating current from said conductors to propel the car over said platform, and a condenser connected across the motor circuit between said wheels and the motor.

14. In a device of the character described, in combination, a flat platform constructed of an insulating material for low voltage and provided with a number of conductors positioned therein and extending thereover in changing directions each with an exposed flat face flush with the surface of said platform and forming therewith a continuous flat surface over which a car may travel, and a car provided with an electric motor adapted to receive its operating current from said conductors and to propel the car over said platform.

Signed at Brooklyn, N. Y. city, in the county of Kings and State of New York, this 11 day of October, 1909.

HARRY HERTZBERG.
MAURICE J. WOHL.

Witnesses:
F. L. COOK,
H. C. CZIESLIK.